United States Patent
Lin et al.

[11] Patent Number: 5,977,875
[45] Date of Patent: Nov. 2, 1999

[54] COLLECTIVE OBJECTS MANAGEMENT SYSTEM USING R.F. OBJECT INDENTIFICATION

[75] Inventors: Fong-Jei Lin, Saratoga; Shengbo Zhu, San Jose, both of Calif.

[73] Assignee: Magnex Corporation, San Jose, Calif.

[21] Appl. No.: 09/144,391

[22] Filed: Aug. 31, 1998

[51] Int. Cl.$^6$ ................................................. G08B 13/14
[52] U.S. Cl. .................. 340/570; 340/572.1; 340/568.2; 340/825.49; 340/825.54
[58] Field of Search .......................... 340/572.1, 572.3, 340/572.4, 572.5, 568.2, 568.3, 568.4, 825.35, 825.49, 825.54, 570

[56] References Cited

U.S. PATENT DOCUMENTS

| | | | |
|---|---|---|---|
| 4,862,160 | 8/1989 | Ekchian et al. | 340/825.54 |
| 5,287,414 | 2/1994 | Foster | 382/1 |
| 5,424,858 | 6/1995 | Gillotte | 359/143 |
| 5,426,284 | 6/1995 | Doyle | 235/385 |
| 5,455,409 | 10/1995 | Smith et al. | 235/385 |
| 5,455,410 | 10/1995 | Schneider | 235/385 |
| 5,721,531 | 2/1998 | Garver et al. | 340/568 |
| 5,739,765 | 4/1998 | Stanfield et al. | 340/825.49 |
| 5,751,221 | 5/1998 | Stanfield et al. | 340/825.35 |

Primary Examiner—Jeffery A. Hofsass
Assistant Examiner—Toan N. Pham

[57] ABSTRACT

A collective objects management system for objects such as documents contained in file folders in drawers of file cabinets. Each file folder has an electrical circuit with a visible indicator mounted on the file folder. Each folder circuit has a crystal which is responsive to an R.F. signal of a specific frequency, the frequency being different for each folder circuit. An associated computer operates an R.F. signal generator to produce an R.F. signal at the frequency of the particular folder circuit of the file folder selected for retrieval. To aid the user, each file drawer has a visible indicator mounted on the front panel, the panel indicator being illuminated when the sought folder is contained in that drawer. The R.F. signal generator can be operated in a sweep mode for checking the integrity of the file. The invention can be applied to a wide variety of collective objects management systems, such as supermarkets, automobile parts distributors, and various manufacturing operations.

42 Claims, 6 Drawing Sheets

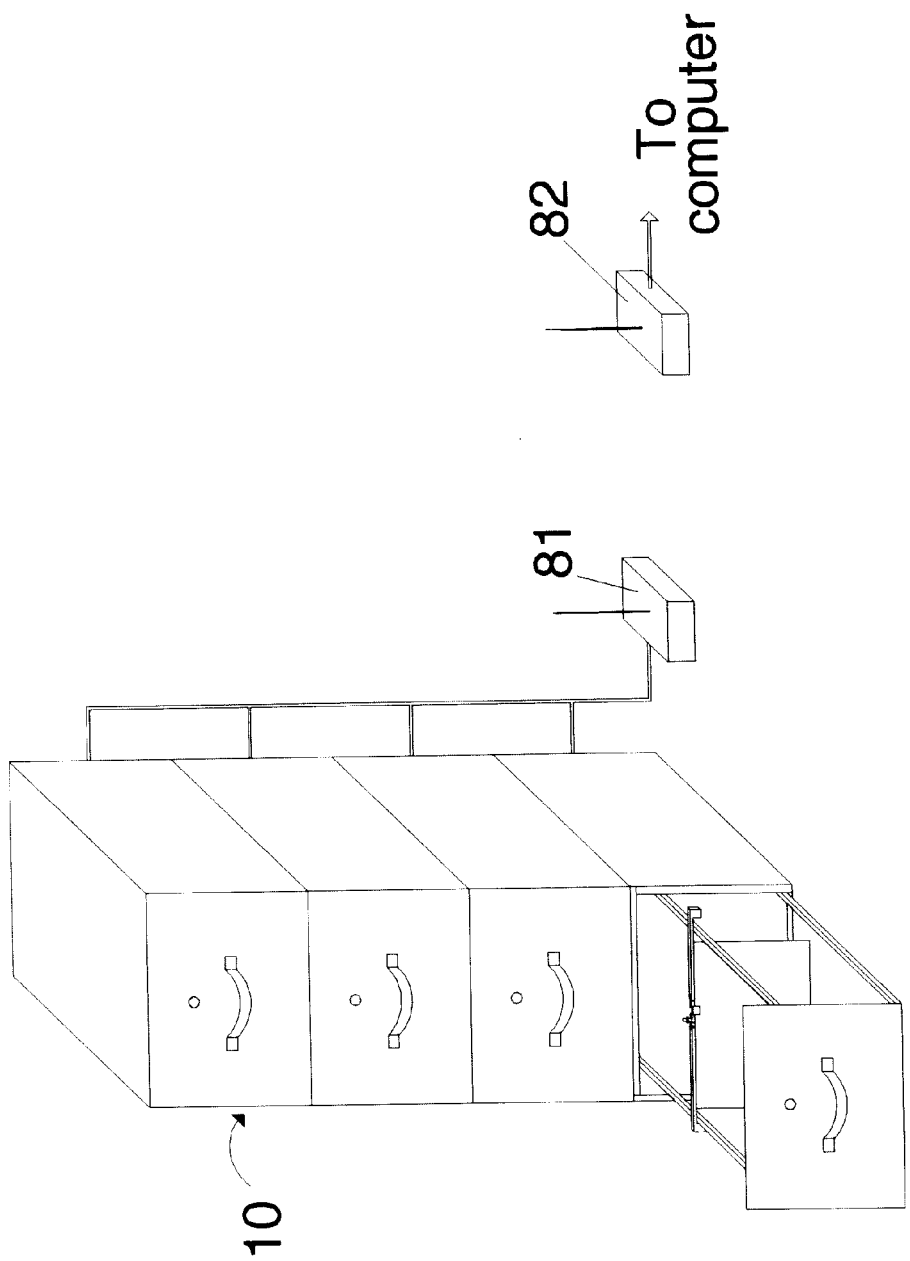

COLLECTIVE OBJECTS MANAGEMENT SYSTEM USING R.F. OBJECT INDENTIFICATION

BACKGROUND OF THE INVENTION

This invention relates to collective objects management systems in general, and in particular to an improved collective objects management system using R.F. object identification.

The term "collective objects management systems" is a term coined to denote systems for generally keeping track of items ("objects") in a collection of items. For example, an automobile parts warehouse at any given time has a collection of vehicle parts ("objects") in inventory. The kind and number of such parts varies every day, as parts are sold and new parts are received. In order to keep track of the number and kind of vehicle parts in inventory, some type of collective vehicle parts management system must be used. Similarly, in a semiconductor manufacturing operation, at any given time there is a collection of integrated circuits ("objects") of one or more types located somewhere in the facility, which must be accounted for using a collective integrated circuits management system. In supermarkets, a collection of a large number of different types of items, such as meats, produce, canned goods and the like is usually in inventory, with the number and types of objects varying widely on a daily basis and thus requiring a complex objects management system. In business offices and some homes, file storage cabinets are typically used to store documents used for both business and personal activities. A typical file storage cabinet has several pull-out drawers each containing a relatively large number of file folders ("objects"), with each folder containing one or more documents. In order to enable the documents contained in the various files to be readily accessed, some type of file management system is necessary.

In the case of file storage management, each file folder is typically provided with a tab portion visible when the file drawer is opened (usually along the upper edge of the folder) and containing readable information describing the content of the folder. The readable information is typically a short form of identification, such as an account name, a subject name (e.g., "Utilities Bills") or the like.

In order to provide ready access to the individual documents contained in the folders, some type of indexing arrangement is normally used to identify the drawer location of each folder. A simple technique commonly employed is an alphabetical index card placed on the front panel of each drawer listing the file folders in alphabetical order. For example, one file drawer panel might have an index card listing files starting with the letters A–F, another drawer might have an index card listing files starting with the letters G–L, etc. Frequently, more sophisticated indexing arrangements are used, such as a computer-based index listing all files by a short form identifier and a corresponding enlarged and more thorough description of the file contents. Even such computer-based arrangements still require the use of a readable tab or tag on each file folder in order to identify a given folder to a user. This is highly undesirable, since it facilitates the search by any unauthorized user for a specific file name or for a file containing information of a particular type. Nevertheless, known file management systems require the use of visible tabs or tags in order for the files to be reasonably locatable.

In those applications in which several individuals have access to the file drawer contents, some arrangement is usually made to monitor the disposition of the files. For example, in a business application, it is convenient and sometimes necessary to provide a sign out and return procedure so that the whereabouts of a given file will always be known. Usually, such monitoring attempts fail to accurately track the files because of the failure of individuals to faithfully follow the procedure. Consequently, at any given time, the integrity of the file management system can only be verified by actually looking through each file drawer and checking the file folders and their contents with the master index This requirement is both time-consuming and burdensome, and thus a severe disadvantage.

In known file management systems of the type described above, once a file folder is provided with a contents identifier, that folder is permanently associated with the nature of its contents. To change the contents to some other category, the folder must either be thrown away and a new, unmarked folder substituted in its place, or the identification label must be changed. In addition, the master index must be up-dated, either manually or by using the computer in a computer-based indexing system. These procedures are not always followed by office personnel, and the integrity of the files system is consequently compromised.

In all examples of known collective objects management systems, either the containers for the different objects or the objects themselves are usually provided with some type of human readable or machine readable identification indicia, such as a label or tag affixed to the object or the container. In more sophisticated systems, a computer is used to assist in keeping track of the objects. When an object is removed from the usual location, some procedure is typically used to note the fact that that object has been removed from its normal location. This is accomplished either by operator entry of the change into the system computer, or by using tag or label reading devices (e.g., bar code readers) to enter the information into the system computer. All known systems suffer from disadvantages similar to those noted above with file management systems. In addition, none provides a simple and efficient way to find a desired object stored somewhere in a large collection of different objects.

SUMMARY OF THE INVENTION

The invention comprises a collective objects management system which is devoid of the above-noted limitations and disadvantages, which can be implemented using standard object containers of known design, and which has several features absent from known collective objects management systems.

In a broadest aspect the invention comprises a collective objects management system which uses R.F. sensitive circuits to maintain control of all objects in a collection. Each object has an associated R.F. sensitive circuit which resonates at a unique frequency when an R.F. signal at that unique frequency is received by the circuit, and an indicator coupled to the R.F. circuit for identifying the object to a human operator. The indicator is preferably a visible indicator-such as an LED- coupled to the object or the container for the object and which can readily be seen by a human operator. Alternatively, an audible indicator-such as a buzzer- can be used.

In a specific implementation of the invention to a file management system, a folder circuit is included in each file folder to be placed in a file drawer. Each folder circuit has a crystal responsive to a particular R.F. frequency, with the resonant frequency of a given crystal different from all the other crystals. Each folder circuit is electrically coupled to a drawer signal input/output using the electrically conductive upper support rails usually found in conventional file cabinets. One of the rails is modified by electrically isolating that rail from the remaining electrically conductive elements in the drawer.

Each folder circuit includes an indicator, preferably an LED visible indicator, mounted along the upper margin of the folder in a location visible to a user when the drawer is opened. In addition, each drawer is provided with an indicator, preferable a flashing LED visible indicator, mounted on the front panel of the drawer. A current detector circuit is used to control the state of the drawer panel indicator.

All drawer input/output terminals are electrically coupled in parallel to an associated computer, either using dedicated connectors (i.e., hard wired) or transceivers (i.e., wireless communication). The computer includes an R.F. signal generator capable of generating signals matching all the crystal frequencies. To find a file, a user specifies that file to the computer, typically by using a keyboard or a mouse. The computer causes the R.F. signal generator to generate an R.F. signal whose frequency matches that of the specified file. The R.F. signal is transmitted to all the file cabinets in the system, and thus to all the file drawers. If the specified file is located in any one of the drawers, the indicator of the drawer containing that file folder, and the indicator of the correct file folder, are both activated. The user then opens the drawer with the active indicator and removes the file folder with the active indicator.

As applied to a file management system, the invention eliminates the need for readable tabs or tags on each file folder, since the correct file is designated by the activated indicator. Also, the nature of a file folder can be changed by simply entering the necessary information into the computer. In addition, the integrity of the entire file system can be checked by using an R.F. sweep frequency generator to sweep the entire frequency range of crystal frequencies and detecting any frequency for which a resonant response is absent. The invention can be readily and conveniently incorporated into existing file cabinets having the electrically conductive dual rail folder support mechanism.

For a fuller understanding of the nature and advantages of the invention, reference should be made to the ensuing detailed description taken in conjunction with the accompanying drawings.

BRIEF DESCRIPTION OF THE DRAWINGS

FIG. 6 is a perspective view of a multiple drawer file cabinet in a wireless embodiment of the invention.

DETAILED DESCRIPTION OF THE PREFERRED EMBODIMENTS

The invention has wide application to a large variety of collective object management systems. The following is a detailed description of one application of the invention in the field of file management systems.

Figure 1:
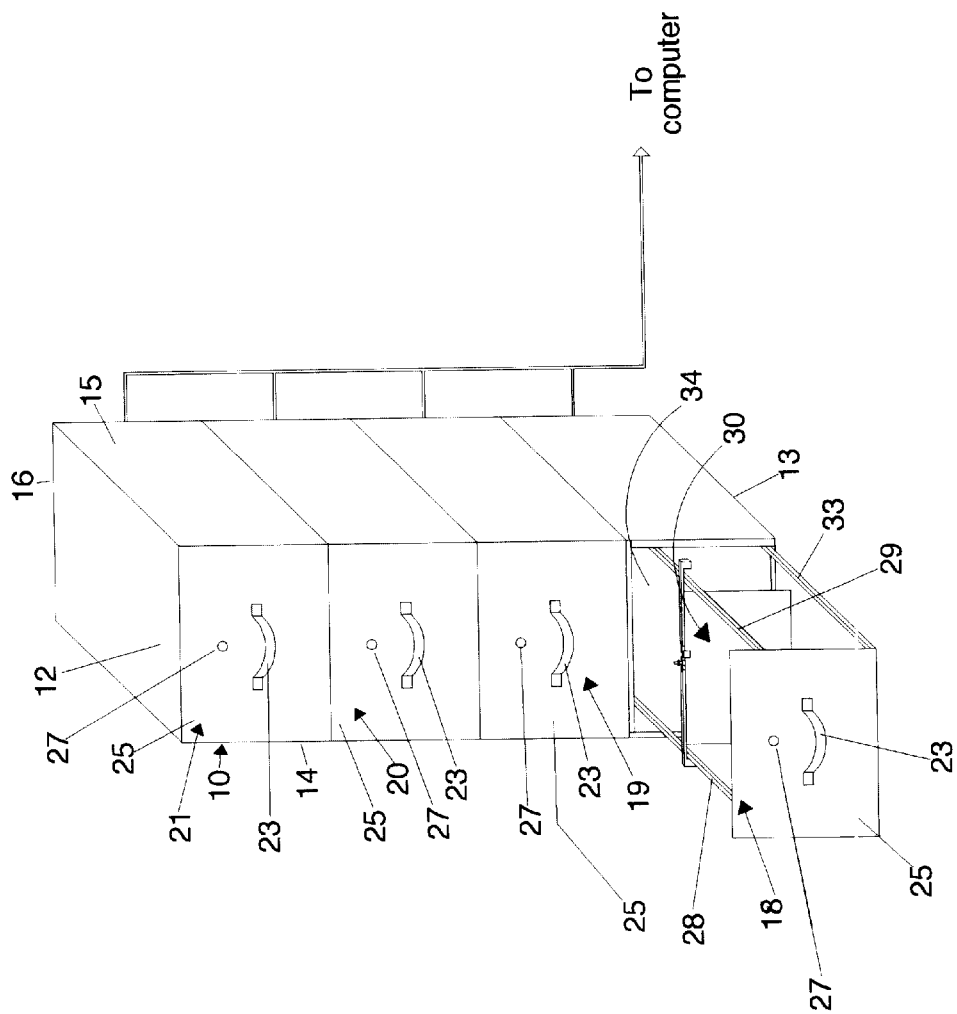
FIG. 1 is a perspective view of a multiple drawer file cabinet illustrating a first embodiment of the invention.

Turning now to the drawings, FIG. 1 is a perspective view, taken from the right front, of a first embodiment of the invention using direct electrical connections between the file cabinets and the associated computer. As seen in this FIG., a multiple drawer file cabinet 10 (four drawers illustrated) of known mechanical construction has the usual top 12, bottom 13, sides 14, 15, and back 16. Four drawers 18–21 are slidably mounted in cabinet 10, each drawer 18–21 having a drawer pull 23 mounted on a front panel 25 thereof. A visible indicator device 27 is also mounted on the front panel 25 of each drawer 18–21. Indicator 27 may comprise any one of a number of known elements capable of providing a visible signal when activated in the manner described below. Examples of suitable indicators are a conventional LED indicator, and a type 276-036 flashing LED indicator available from Radio Shack Corporation.

Lowermost drawer 18 is shown in the opened position in order to provide a perspective view of the basic drawer structure and the manner in which a file folder is removably supported in a file drawer. As shown, drawer 18 is provided with a pair of upper support rails 28, 29, which serve the primary purpose of supporting individual file folders, such as file folder 30, in the drawer. Secondarily, rails 28, 29 may also provide structural rigidity for the drawer 18 itself. Drawer 18 also has a pair of lower rails 32, 33 (only one of which is visible in FIG. 1) which complete the horizontal structural elements. In a commonly used file cabinet structure, rails 28, 29, 32, and 33 may form an inner frame insert (along with vertically arranged frame members) which can be physically installed in a standard drawer. To complete the drawer structure, a back 34 is connected to the rails 28, 29, 32, 33. All file folders, such as folder 30, are removably supported by upper rails 28, 29 using horizontal support braces 35, 36, to which the folder 30 is mechanically secured. The mechanical structure of folder 30 and rails 28, 29 is conventional. The structure and arrangement of drawers 19–21 are identical to that of drawer 18.

Figure 2:
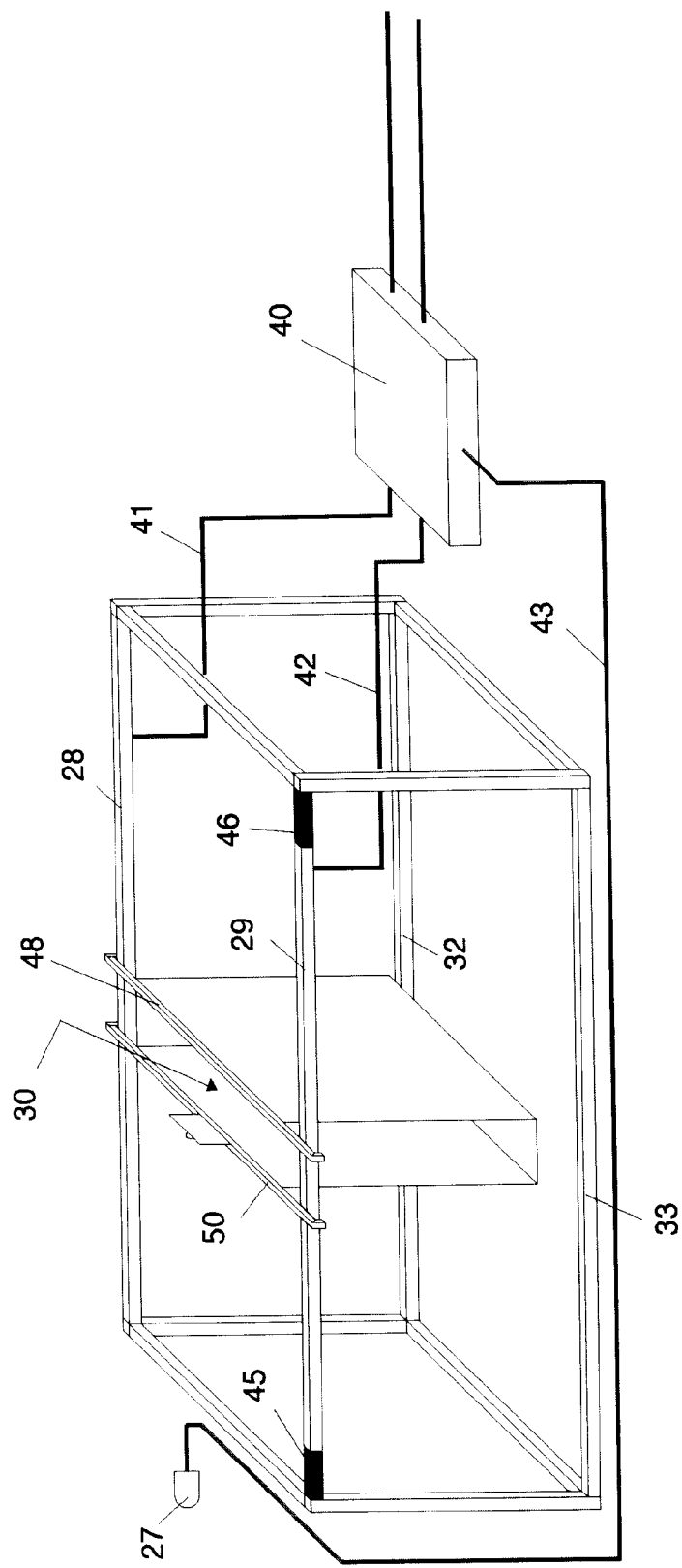
FIG. 2 is a schematic side perspective view of a single file drawer and file folder according to the invention.

As best shown in FIG. 2, each one of the upper pair of support rails 28, 29 of each drawer 18–21, as well as the drawer indicator 27, are electrically connected to an associated computer via a separate current detector circuit 40 located in any convenient location in the respective drawer. Stated differently, each drawer has its own current detector 40. Each current detector 40 functions in the manner described below. In FIG. 2, left rail 28, right rail 29, and indicator 27 are each electrically connected to current detector 40 by conductive wires 41, 42, and 43, respectively.

Still with reference to FIG. 2, one of the two upper support rails 28, 29 is electrically isolated from the remaining electrically conductive drawer structural elements. In FIG. 2, the isolated rail is shown as right rail 29 with electrically non-conductive support inserts 45, 46. Thus, one rail (right rail 29) of each drawer 18–21 is mechanically supported in the drawer but is electrically isolated from the rest of the conductive structural elements.

As seen in FIG. 2, file folder 30 has the conventional U-shaped cross-sectional construction which has proven to be popular in the office equipment industry for containing documents. Each side (front and back) of folder 30 is mechanically supported by a mechanical brace. One of the braces (brace 48) is of unitary construction and comprises a single rigid electrically non-conductive arm having downwardly folded hook-like ends which slidably engage the support rails 28, 29. The other brace (brace 50) has a special construction according to the invention.

Figure 3:
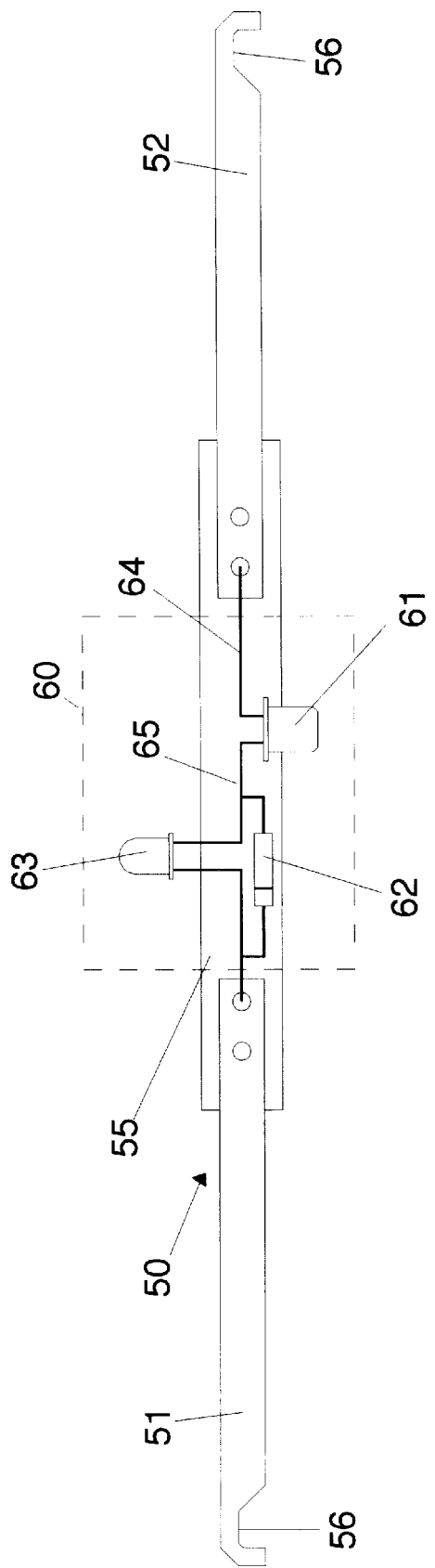
FIG. 3 is a side elevational view of the electrical components located at the file folder according to the invention.

With reference to FIG. 3, which is a front elevational view of brace 50, this element includes a left arm 51, a right arm 52, and a central non-conductive support portion 55. Arms 51 and 52 are both constructed from an electrically conductive material, such as steel, aluminum, or the like, and each has a downwardly turned hook-like end 56 which mechanically and electrically engages the associated one of rails 28, 29 when the folder is properly positioned in the file drawer. An R.F. responsive electrical circuit 60 comprising a crystal 61, a diode 62, and an LED indicator 63 is mounted centrally of brace 50. One terminal 64 of crystal 61 is electrically connected to arm 52. The other terminal 65 of crystal 61 is electrically connected to one terminal of diode 62 and one terminal of LED 63. The other terminals of diode 62 and LED 63 are electrically connected to arm 51. Thus, electrical circuit 60 is electrically coupled between arms 51, 52 so that circuit 60 is electrically coupled to rails 28, 29 when file folder 30 is properly supported in file drawer 18. LED is mechanically supported by brace 50 in such a manner as to protrude above the upper margin of file folder 30 so that LED 63 is visible above the file folder when the file drawer 18 is opened.

Figure 4:
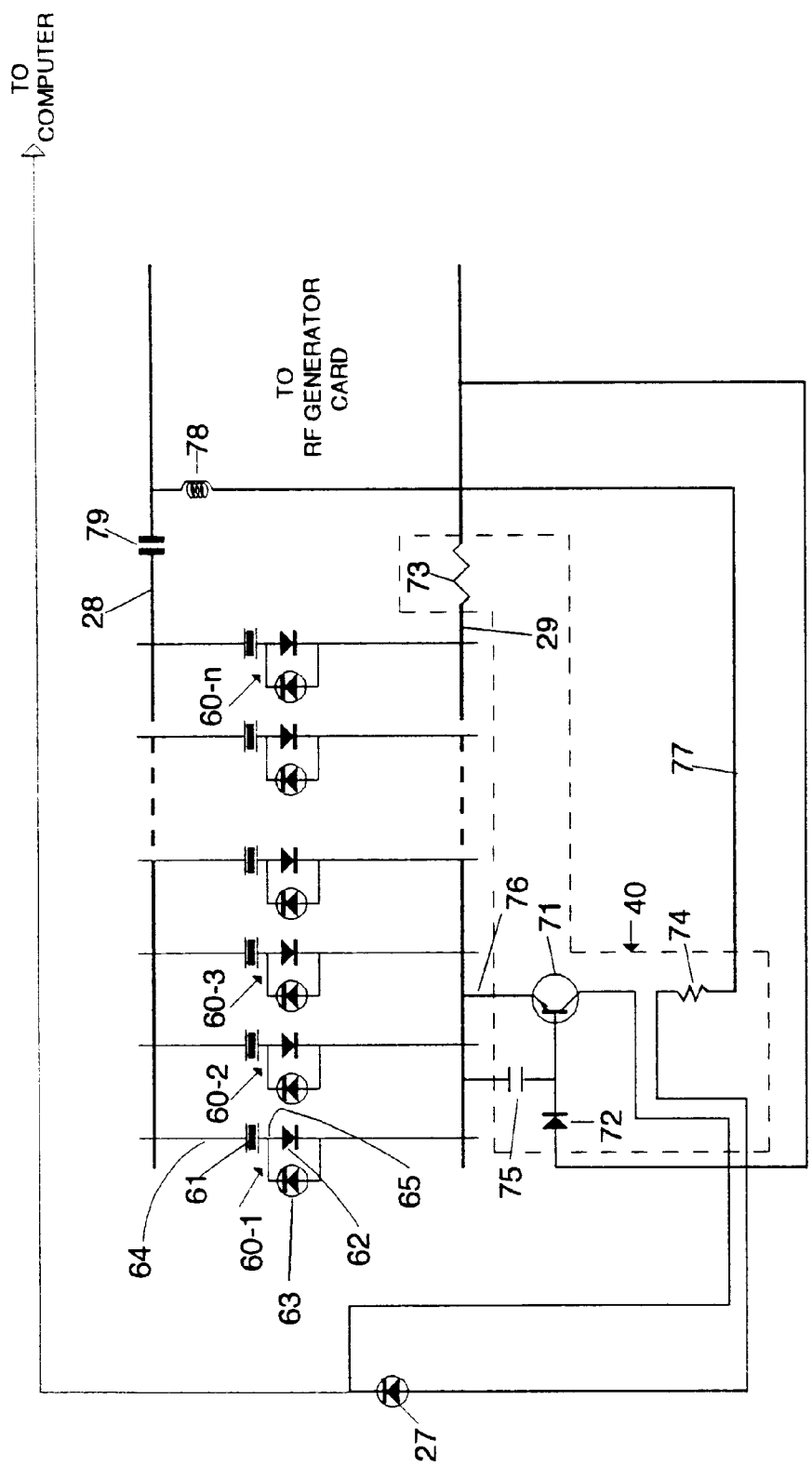
FIG. 4 is a schematic diagram of the R.F circuitry located at the file cabinet according to the invention.

FIG. 4 is a circuit diagram showing the interconnection between all folder circuits 60 in a single file drawer 18–21, as well as the front panel indicator 27. As seen in this FIG., each circuit 60-1, 60-2, . . . 60-n is electrically coupled across conductive support rail 28, 29. All ciscuits 60-1, 60-2, . . . 60-n are connected in parallel. Current detector circuit 40, which comprises a switching transistor 71, a diode 72, a resistor 73, a resistor 74, and a capacitor 75, all connected as shown, has a first node 76 coupled to one of the rails 28, 29, and a second node 77 coupled to the other one of rails 28, 29. A coil 78 is coupled between second node 77 and its associated rail. A capacitor 79 is coupled between the rail-side terminal of coil 78 and the common crystal input of circuits 60-1, 60-2, . . . 60-n.

Each crystal 61 in a given folder circuit has a resonant frequency different from that of the crystals in the other folder circuits. All resonant frequencies are preferably in the R.F. range of the spectrum, and may range in value from about 2 MHz. to about 12 MHz. The frequency separation between crystals is a matter of design choice, and good results have been obtained with crystals in the approximately 5.000 MHz range by using a minimum frequency separation of 0.001 MHz.

Although not illustrated, the associated computer has an R.F. signal generator which is electrically coupled in parallel to the folder circuits in all the file drawers. The R.F. signal generator is a mixed signal source which produces both an R.F. AC signal and a relatively low voltage (e.g. 9 volts) DC signal. The R.F. signal passes through capacitor 79 but is blocked by coil 78. The DC signal passes through coil 78 but is blocked by capacitor 79. The DC signal is used to operate transistor 71 in detector circuit 40 and indicator 27.

Figure 5:
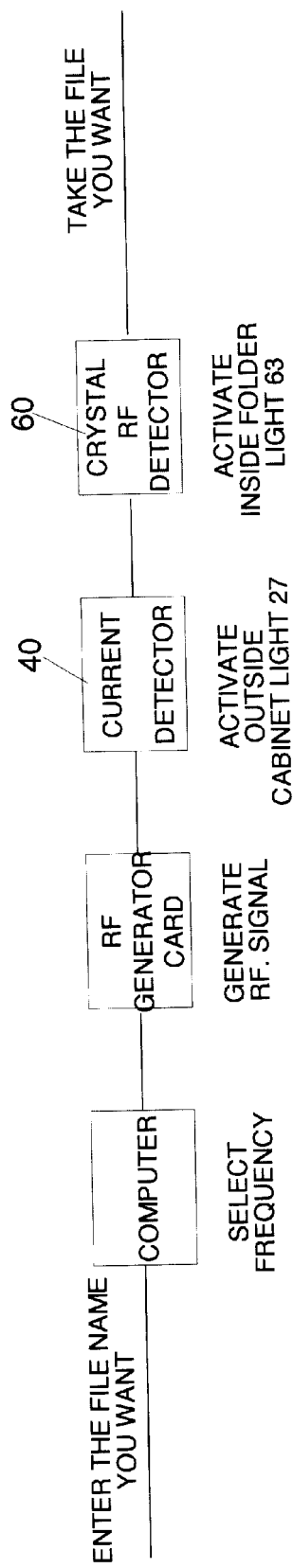
FIG. 5 is a flow chart illustrating use of the invention.

When a signal having an R. F. component whose frequency matches the resonant frequency of a crystal 61 of one of the folders is present on conductor 28, that crystal will resonate and present a low resistance to the passage of R.F. current through that branch of the circuit. The flow of R.F. current through that branch will cause the corresponding LED to be activated. The R.F. current also flows through common resistor 73 causing an R.F. voltage drop, and this voltage drop is rectified by diode 72. This saturates transistor 71, which enables DC current to pass through indicator 27, transistor 71 and rail 29 back to the source. When DC current passes through indicator 27, this element is activated. FIG. 5 is a flow chart which illustrates the operation of the invention to find a single file folder. As seen in this FIG., the user enters the name of the desired file into the computer, typically using a keyboard or a mouse. The computer performs a table look-up of the resonant frequency for that particular file folder, turns on the R.F. signal generator, and causes an R. F signal of the correct frequency to be generated and transmitted in parallel to all file drawer conductor rails 28, 29. The file folder circuit having the crystal of that frequency (if present in any of the drawers) will respond to the R.F. signal by illuminating the LED indicator for that circuit. All other file folder circuits will not respond to the particular frequency, so that the LED indicator of the correct folder will be the only one illuminated. In addition, the front panel indicator of the file drawer holding the correct file folder will be illuminated by the current detector circuit for that drawer so that the user need only open the correct drawer to retrieve the proper file.

The R.F. signal generator in the associated computer may comprise a sweep frequency generator capable of generating R.F. signals in a swept mode, beginning with the lowest crystal resonant frequency in the file management system, and ending with the highest crystal resonant frequency in the system. With such a signal generator, the integrity of the entire collection of files can be quickly checked by instructing the computer to activate the R.F. signal generator in the sweep mode. As the signal frequency is swept over the entire range, all folder circuits which are present in the collection of file cabinets will resonate at their respective frequency and this can be detected at the computer using a conventional R.F. detector circuit. Any missing file will not respond, and this also can be detected at the computer using the same circuit. Any files detected as missing can be correlated to the file identification in the computer by noting the frequency of the non-responsive folder circuits.

The system may be initially configured in several different ways. The most fundamental way is to place a single file folder 30 into a drawer, cause the R.F. signal generator to sweep the range of frequencies, note the frequency at which the crystal in that folder resonates, enter that frequency number into a list, remove the folder, insert another folder, and repeat this process for all folders desired on a serial basis. This method works well for a new system with no existing folders and a relatively small number of folders required initially. A more useful technique is to insert a first folder into a drawer, sweep the R.F. frequency, note the resonant frequency, enter that number into a new list; insert a second folder to the drawer without removing the first, sweep the frequency, add the resonant frequency of the new folder to the list; insert a third folder into the drawer, sweep the frequency, add the resonant frequency of the third folder to the list; etc. As each new folder is inserted into the drawer, the computer has a running list of frequencies already identified and, since each crystal frequency is unique, there can be no duplications. An even more sophisticated technique, and one which is most useful for existing file management systems having a large number of folders already in use, proceeds as follows. A requisite number of folders 30 sufficient to contain all existing types of documents in the file management system is distributed among a number of drawers. The R.F. generator is activated in the sweep mode, and each resonant frequency is detected and entered into a list by the computer. After all frequencies have been detected and entered, the computer initializes the R.F. generator and causes it to sweep all entered frequencies. As a given frequency is reached, the generator is locked to that frequency, the drawer and folder indicators 27, 63 are activated, and a human operator manually places the associated documents into that particular folder and enters appropriate folder identification information into the computer (e.g., "Utilities Bills"). Once the identification information is entered for a given frequency and folder, the generator is activated to sweep to the next frequency in the list, and the generator is locked at that frequency until the documents are inserted into the folder and the folder information is entered into the computer. This process continues until all frequencies have been accounted for.

FIG. 6 illustrates an alternate embodiment of the file management system implementation of the invention using wireless communication between the individual file cabinets and the associated computer. As seen in this FIG., cabinet 10 is provided with a transceiver 81 for communication with the associated computer. The associated computer is provided with a matching transceiver 82. Operation of the FIG. 6 system is essentially identical to that of the FIG. 1 system, with the exception that the R.F. signals are transmitted to file cabinet 10 using transceivers 81, 82, rather that the hard wired connections of the FIG. 1 embodiment. In addition, there may be additional security considerations to the wireless embodiment of FIG. 6 to prevent unauthorized transmission and reception of the R.F. signals.

As will now be apparent, file management systems incorporating the invention provide a number of significant advantages absent from the prior art. Firstly, since the invention provides an automatic visible indication of the drawer and file folder containing the desired documents, the time to find and retrieve a file is significantly reduced. In addition, the integrity of the entire file system can be easily checked on a periodic or ad hoc basis in a relatively short period of time, and a list of missing files can be automatically compiled by the computer. Moreover, the use of visible indicators to signal the location of a specific file eliminates the need to separately identify each file by using specific descriptors attached to each file. Consequently, any unauthorized individual wishing to find a particular file containing information of a specific type by manually searching through the file drawers and file folders would be forced to review the contents of each individual file folder (as opposed to merely reading the file label found on prior art file folders), which adds a significant barrier to unauthorized review of file folder information. Still further, since the contents of a given file folder are independent of the file folder identification, any file can be reassigned to different information contents or renamed by using the computer to effect the changes. Stated differently, the file folder itself need not be physically altered in order to change the file folder designation. Thus, once a complete set of file folders is in place, there is no need to add new folders.

File management systems incorporating the invention may also be modified using the computer to add new file folders, delete old file folders no longer considered necessary, and to rearrange the grouping of file folders.

Although the above description is devoted to an implementation of the invention in the field of file management systems, the invention has much wider application. In general, the invention can be used in any collective object management system in which the need exists for a technique for rapidly identifying a given class or type of object from a collection of objects. For example, in an automotive parts warehouse operation, the objects may be individual vehicle parts (such as carburetors, alternators, gaskets or the like) stored in bins on shelves. In a manufacturing operation, the objects may be the individual items manufactured in the plant (such as different types of integrated circuits manufactured by an integrated circuits manufacturer) contained in individual packages. In any application, the R.F. circuit and indicator associated to a specific object are closely coupled to the object itself and electrically coupled to the R.F. generator so that the circuits can respond to the reception of an R.F. signal of the correct frequency and activate the indicator in such a way that a human operator can locate the object specified by the frequency (or the absence of such an object).

Although the above provides a full and complete disclosure of the preferred embodiments of the invention, various modifications, alternate constructions and equivalents will occur to those skilled in the art. For example, while the invention has been described with reference to specific R.F. frequencies, other frequencies may be employed, depending on the preferences of the system designer. Moreover, while the indicators 27, 63 have been described as visible indicators, other types of indicators, such as audible indicators, may be used, if desired. In addition, while the invention has been described with reference to a single file cabinet, it is understood that the invention may be implemented using multiple file cabinets positioned at the same or different locations in an office. Further, the invention may be used to manage a file system of many cabinets positioned at different physical locations using an internal or an external computer network, if desired. Therefore, the above should not be construed as limiting the invention, which is defined by the appended claims.

What is claimed is:

1. A system for managing file folders in a filing cabinet, said system comprising:

a cabinet drawer frame having a pair of electrically conductive support rails;

a pair of electrically conductive signal leads coupled to said support rails;

a plurality of file folders each having a pair of electrically conductive support arms arranged to engage said support rails so as to be removably suspended thereby; and a plurality of r.f. circuits each carried by a different one of said folders, each of said plurality of r.f. circuits having a crystal resonant at a specific frequency and a visible indicator activated whenever the associated crystal detects an r.f. signal at the specific frequency of that crystal, the resonant frequency of each of said crystals being different from the remaining ones of said crystals so that an r.f. signal applied to said pair of electrically conductive signal leads causes only one of said plurality of crystals to resonate and only the associated visible indicator to be activated.

2. The system of claim 1 wherein said file folders each have an upper margin; and wherein said indicators are located adjacent said upper margin so as to be visible.

3. The system of claim 1 wherein each of said visible indicators comprises an LED.

4. The system of claim 1 further including a current detector electrically coupled to said pair of support rails for detecting resonance of one of said crystals, and an additional visible indicator coupled to and activated by said current detector for signifying that one of said crystals is at resonance.

5. The system of claim 4 wherein said additional visible indicator comprises an LED.

6. The system of claim 4 wherein said additional visible indicator comprises an LED with an integral flashing circuit.

7. The system of claim 4 wherein said cabinet drawer frame has a front panel; and wherein said additional visible indicator is located on said front panel.

8. A system for managing file folders in a file cabinet, said system comprising:

a file cabinet having a plurality of file drawer locations;

a plurality of file drawers each slidably mounted in a different one of said file drawer locations between a closed position and an opened position, each of said plurality of file drawers having a pair of electrically conductive support rails;

a plurality of pairs of electrically conductive signal leads each coupled to a different one of said plurality of pairs of support rails, each said pair of electrically conductive signal leads being coupled in parallel to a common signal input terminal;

a plurality of file folders each having a pair of electrically conductive support arms arranged to engage said support rails so as to be removably suspended thereby; and a plurality of r.f. circuits each carried by a different one of said folders, each of said plurality of r.f. circuits having a crystal resonant at a specific frequency and a visible indicator activated whenever the associated crystal detects an r.f. signal at the specific frequency of that crystal, the resonant frequency of each of said crystals being different from the remaining ones of said crystals so that an r.f. signal of a specific frequency applied to said common input terminal causes only one of said plurality of crystals to resonate and only the visible indicator associated to said only one of said plurality of crystals to be activated.

9. The system of claim 8 wherein said file folders each has an upper margin; and wherein said indicators are located adjacent said upper margin so as to be visible whenever the associated file drawer is opened.

10. The system of claim 8 wherein each of said visible indicators comprises an LED.

11. The system of claim 8 further including a plurality of drawer current detectors each associated to a different one of said plurality of file drawers and each electrically coupled to the pair of support rails in the associated drawer for detecting resonance of one of said crystals in the associated drawer, and a plurality of additional visible indicators each coupled to and activated by an associated different one of said plurality of current detectors for signifying that one of said crystals in the associated drawer is at resonance.

12. The system of claim 11 wherein said plurality of additional visible indicators comprises LEDs.

13. The system of claim 11 wherein said plurality of additional visible indicators comprises LEDs with an integral flashing circuit.

14. The system of claim 11 wherein each of said plurality of file drawers has a front panel; and wherein said additional visible indicators are mounted on the front panel of the associated file drawer so as to provide a visible indication of a resonant crystal in the file drawer when the drawers are closed.

15. For use in a system for managing file folders in a file cabinet having at least one file drawer with a pair of electrically conductive support rails for removably suspending a plurality of file folders each having a pair of electrically conductive support arms adapted to engage the file drawer support rails; the improvement comprising a plurality of r.f. circuits each adapted to be mounted on a file folder, each of said plurality of r.f. circuits having a crystal resonant at a specific frequency and a visible indicator activated whenever the associated crystal detects an r.f. signal at the specific frequency of that crystal, the resonant frequency of each of said crystals being different from the remaining ones of said crystals so that an r.f. signal applied to the electrically conductive support rails causes only one of said plurality of crystals to resonate and only the associated visible indicator to be activated.

16. The improvement of claim 15 wherein each of said visible indicators comprises an LED.

17. The improvement of claim 15 further including a current detector adapted to be electrically coupled to the file drawer support rails for detecting resonance of any one of said crystals, and an additional visible indicator coupled to and activated by said current detector for signing that one of said crystals is at resonance.

18. The improvement of claim 17 wherein said additional visible indicator comprises an LED.

19. The improvement of claim 17 wherein said additional visible indicator comprises an LED with an integral flashing circuit.

20. A system for managing objects distributed in an object location space, said system comprising:

a receptacle for a plurality of objects, said receptacle having a pair of electrically conductive members;

a pair of electrically conductive signal leads coupled to said pair of electrically conductive members; and a plurality of r.f. circuits each associated to a different one of said objects, each of said plurality of r.f. circuits having a pair of electrically conductive terminals in electrical contact with said electrically conductive members when the associated object is located in said receptacle, a crystal resonant at a specific frequency and an indicator activated whenever the associated crystal detects an r.f. signal at the specific frequency of that crystal, the resonant frequency of each of said crystals being different from the remaining ones of said crystals so that an r.f. signal applied to said pair of electrically conductive signal leads causes only one of said plurality of crystals to resonate and only the associated indicator to be activated.

21. The system of claim 20 wherein said indicator is a visible indicator.

22. The system of claim 21 wherein said visible indicator is an LED.

23. The system of claim 20 further including a current detector electrically coupled to said pair of electrically conductive members for detecting resonance of any one of said crystals in said receptacle, and an additional indicator coupled to and activated by said current detector for signifying that one of said crystals in said receptacle is at resonance.

24. The system of claim 23 wherein said additional indicator is a visible indicator.

25. The system of claim 24 wherein said additional visible indicator is an LED.

26. The system of claim 24 wherein said additional visible indicator is an LED with an integral flashing circuit.

27. The system of claim 24 wherein said receptacle has a front panel; and wherein said additional indicator is located on said front panel.

28. A system for managing objects distributed in an object location space, said system comprising:

a plurality of receptacles for a plurality of objects, each of said receptacles having a pair of electrically conductive members;

a plurality of pairs of electrically conductive signal leads each coupled to a different one of said plurality of pairs of electrically conductive members, each of said plurality of pairs of electrically conductive signal leads being coupled in parallel to a common signal input terminal; and a plurality of r.f. circuits each associated to a different one of said objects, each of said plurality of r.f. circuits having a pair of electrically conductive terminals in electrical contact with one of said plurality of pairs of electrically conductive members when the associated object is located in one of said receptacles, a crystal resonant at a specific frequency and an indicator activated whenever the associated crystal detects an r.f. signal at the specific frequency of that crystal, the resonant frequency of each of said crystals being different from the remaining ones of said crystals so that an r.f. signal applied to said common input terminal causes only one of said plurality of crystals to resonate and only the associated indicator to be activated.

29. The system of claim 28 wherein said indicator is a visible indicator.

30. The system of claim 28 wherein said visible indicator is an LED.

31. The system of claim 28 further including a plurality of current detectors each associated to a different one of said plurality of receptacles and each electrically coupled to said pair of electrically conductive members in the associated receptacle for detecting resonance of any one of said crystals in said associated receptacle, and a plurality of additional indicators each coupled to and activated by an associated different one of said plurality of current detectors for signifying that one of said crystals in the associated receptacle is at resonance.

32. The system of claim 31 wherein said plurality of additional indicators comprises visible indicators.

33. The system of claim 32 wherein each of said additional visible indicator is an LED.

34. The system of claim 32 wherein each of said additional visible indicator is an LED with an integral flashing circuit.

35. The system of claim 31 wherein each of said receptacles has a front panel; and wherein said additional indicators are located on the front panel of the associated receptacle so as to provide an indication of a resonant crystal in the associated receptacle.

36. For use in a system for managing objects distributed in an object location space having at least one receptacle with a pair of electrically conductive members; the improvement comprising a plurality of r.f. circuits each associated to a different object, each of said plirality of r.f. circuits having a pair of electrically conductive terminals in electrical contact with said electrically conductive members when the associated object is located in said receptacle, a crystal resonant at a specific frequency and an indicator activated whenever the associated crystal detects an r.f. signal at the specific frequency of that crystal, the resonant frequency of each of said crystals being different from the remaining ones of said crystals so that an r.f. signal applied to said pair of electrically conductive members causes only one of said plurality of crystals to resonate and only the associated indicator to be activated.

37. The improvement of claim 36 wherein said indicator is a visible indicator.

38. The improvement of claim 37 wherein said visible indicator is an LED.

39. The improvement of claim 36 further including a current detector electrically coupled to said pair of electrically conductive members for detecting resonance of any one of said crystals in said receptacle, and an additional indicator coupled to and activated by said current detector for signifying that one of said crystals in said receptacle is at resonance.

40. The improvement of claim 39 wherein said additional indicator is a visible indicator.

41. The improvement of claim 40 wherein said visible indicator is an LED.

42. The improvement of claim 40 wherein said visible indicator is an LED with an integral flashing circuit.

* * * * *